(12) United States Patent
Frost (10) Patent No.: US 8,473,900 B2
(45) Date of Patent: Jun. 25, 2013

(54) COMBINING CLASSES REFERENCED BY IMMUTABLE CLASSES INTO A SINGLE SYNTHETIC CLASS

(75) Inventor: Gary R. Frost, Driftwood, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1025 days.

(21) Appl. No.: 12/496,343

(22) Filed: Jul. 1, 2009

(65) Prior Publication Data

US 2011/0004866 A1 Jan. 6, 2011

(51) Int. Cl.
*G06F 9/44* (2006.01)
*G06F 9/45* (2006.01)

(52) U.S. Cl.
USPC ................ 717/109; 717/116; 717/120

(58) Field of Classification Search
USPC ................. 717/108–116, 120–123
See application file for complete search history.

(56) References Cited

U.S. PATENT DOCUMENTS

| | | | |
|---|---|---|---|
| 4,558,413 A * | 12/1985 | Schmidt et al. | 717/170 |
| 4,775,932 A | 10/1988 | Oxley et al. | |
| 4,989,134 A | 1/1991 | Shaw | |
| 5,136,706 A | 8/1992 | Courts | |
| 5,355,483 A | 10/1994 | Serlet | |
| 5,481,712 A * | 1/1996 | Silver et al. | 717/109 |
| 5,530,850 A | 6/1996 | Ford et al. | |
| 5,551,003 A | 8/1996 | Mattson et al. | |
| 5,560,003 A | 9/1996 | Kolodner et al. | |
| 5,561,786 A | 10/1996 | Morse | |
| 5,652,883 A | 7/1997 | Adcock | |
| 5,687,368 A | 11/1997 | Nilsen | |
| 5,751,613 A | 5/1998 | Doty et al. | |
| 6,081,665 A | 6/2000 | Nilsen et al. | |
| 6,085,035 A * | 7/2000 | Ungar | 717/116 |
| 6,199,075 B1 | 3/2001 | Ungar et al. | |
| 6,300,962 B1 | 10/2001 | Wishoff et al. | |
| 6,470,361 B1 | 10/2002 | Alpern et al. | |
| 6,526,422 B1 | 2/2003 | Flood et al. | |
| 6,560,619 B1 | 5/2003 | Flood et al. | |
| 6,760,815 B1 | 7/2004 | Traversat et al. | |
| 6,763,440 B1 | 7/2004 | Traversat | |
| 6,804,762 B1 | 10/2004 | Dussud et al. | |
| 6,823,351 B1 | 11/2004 | Flood et al. | |

(Continued)

OTHER PUBLICATIONS

Riehle, "Value object", ACM PLoP, pp. 1-6, 2006.*

(Continued)

*Primary Examiner* — Anil Khatri
(74) *Attorney, Agent, or Firm* — Rory D. Rankin; Meyertons, Hood, Kivlin, Kowert & Goetzel, P.C.

(57) ABSTRACT

A system and method for creating synthetic immutable classes. A processor identifies first and second classes, instances of which include first and second data fields, respectively. The first data fields include a data field that references the second class. In response to determining that the first class is immutable and the second class is immutable, the processor constructs a first synthetic immutable class, an instance of which comprises a combination of the first data fields and the second data fields. The processor creates an instance of the first synthetic immutable class in which the first data fields and the second data fields occupy a contiguous region of a memory. In response to determining the first synthetic immutable class does not include an accessor for the second class, the processor combines header fields of the first and second data fields into a single data field in the first synthetic immutable class.

16 Claims, 8 Drawing Sheets

U.S. PATENT DOCUMENTS

| | | | |
|---|---|---|---|
| 6,826,583 B1 | 11/2004 | Flood et al. | |
| 6,839,725 B2 | 1/2005 | Agesen et al. | |
| 6,865,585 B1 | 3/2005 | Dussud | |
| 6,868,488 B2 | 3/2005 | Garthwaite | |
| 6,901,587 B2 | 5/2005 | Kramskoy et al. | |
| 6,925,638 B1* | 8/2005 | Koved et al. | 717/155 |
| 6,931,423 B2 | 8/2005 | Sexton et al. | |
| 6,996,590 B2 | 2/2006 | Borman et al. | |
| 7,010,555 B2 | 3/2006 | Blandy et al. | |
| 7,016,923 B2 | 3/2006 | Garthwaite et al. | |
| 7,017,162 B2 | 3/2006 | Smith et al. | |
| 7,031,990 B2 | 4/2006 | Garthwaite | |
| 7,051,056 B2 | 5/2006 | Rodriguez-Rivera et al. | |
| 7,065,617 B2 | 6/2006 | Wang | |
| 7,069,280 B2 | 6/2006 | Garthwaite | |
| 7,093,231 B2* | 8/2006 | Nuss | 717/114 |
| 7,103,873 B2* | 9/2006 | Tanner et al. | 717/109 |
| 7,120,898 B2* | 10/2006 | Grover et al. | 717/114 |
| 7,231,632 B2* | 6/2007 | Harper | 717/109 |
| 7,408,782 B2 | 8/2008 | Austin et al. | |
| 7,412,466 B1 | 8/2008 | Garthwaite | |
| 7,496,892 B2* | 2/2009 | Nuss | 717/114 |
| 7,614,041 B2* | 11/2009 | Harper | 717/120 |
| 7,627,862 B2* | 12/2009 | Chen | 717/146 |
| 7,657,899 B2* | 2/2010 | Werner | 719/330 |
| 7,827,525 B1* | 11/2010 | Navaro | 717/108 |
| 8,032,860 B2* | 10/2011 | Piehler et al. | 717/110 |
| 8,327,327 B2* | 12/2012 | Bierhoff et al. | 717/116 |
| 2004/0039759 A1 | 2/2004 | Detlefs et al. | |
| 2004/0078381 A1 | 4/2004 | Blandy et al. | |
| 2004/0111445 A1 | 6/2004 | Garthwaite et al. | |
| 2004/0111718 A1 | 6/2004 | Detlefs | |
| 2004/0128329 A1 | 7/2004 | Ben-Yitzhak et al. | |
| 2004/0133759 A1 | 7/2004 | Sekiguchi | |
| 2004/0162860 A1 | 8/2004 | Detlefs | |
| 2004/0162861 A1 | 8/2004 | Detlefs | |
| 2005/0114844 A1 | 5/2005 | Betancourt et al. | |
| 2005/0132374 A1 | 6/2005 | Flood et al. | |
| 2005/0149686 A1 | 7/2005 | Bacon et al. | |
| 2005/0166028 A1 | 7/2005 | Chung et al. | |
| 2005/0198079 A1 | 9/2005 | Heeb | |
| 2005/0235120 A1 | 10/2005 | Dussud | |
| 2005/0240943 A1 | 10/2005 | Smith et al. | |
| 2005/0273567 A1 | 12/2005 | Blandy | |
| 2005/0278497 A1 | 12/2005 | Pliss et al. | |
| 2006/0059453 A1 | 3/2006 | Kuck et al. | |
| 2006/0092161 A1 | 5/2006 | Meeker | |
| 2007/0255909 A1 | 11/2007 | Gschwind et al. | |
| 2008/0162611 A1 | 7/2008 | Wolczko et al. | |

OTHER PUBLICATIONS

Porat et al, "Automatic detection of immutable field in Java", ACM CASCON, pp. 1-15, 2000.*

Kjolstad et al, "Transformation for class immutability", ACM ICSE, pp. 61-70, 2011.*

Malitsky, "Processing heterenenous abstract syntax trees with the mutable class pattern", ACM OOPSLA, pp. 697-701, 2008.*

Wilson, Paul R., "Uniprocessor Garbage Collection Techniques," Technical Report, The University of Texas, Jan. 1994.

Hudson, et al., "Incremental Collection of Mature Objects," Proceedings of the Int'l Workshop on Memory Management, 1992, 16 pages.

Printezis, et al. "A Generational Mostly-Concurrent Garbage Collector," 1998, 12 pages.

Lieberman, et al., "A Real-Time Garbage Collector Based on the Lifetimes of Objects," Communications of the ACM, Jun. 1983, vol. 26, No. 6, pp. 419-429.

Detlefs, et al., "Garbage-First Garbage Collection," Sun Microsystems, Inc., 2004, pp. 37-48.

Bacon, et al., "The Metronome: A Simpler Approach to Garbage Collection in Real-Time Systems," Springer-Verlag Berlin Heidelberg 2003, pp. 466-478.

Sachindran, et al., "Mark-Copy: Fast Copying GC with Less Space Overhead," ACM, 2003, 18 pages.

Hallenberg, et al., "Combining Region Inference and Garbage Collection", PLDI '02, Jun. 17-19, 2002, Berlin, Germany.

"Garbage Collection"; Sep. 27, 2004; 7 pages; printed off website www.memorymanagement.org.

Abuaiadh, et al; "An Efficient Parallel Heap Compaction Algorithm"; OOPSLA'04; Oct. 24-28, 2004; pp. 224-236; Vancouver, British Columbia, Canada.

Agesen, et al al; "An Efficient Meta-Lock for Implementing Ubiquitous Synchronization"; Sun Microsystems; Apr. 1999; pp. 1-27; SMLI TR- 99-76; Palo Alto, CA; USA.

Agesen, et al; "Mixed-mode Bytecode Execution"; Sun Microsystems; Jun. 2000; pp. 1-20; SMLI TR-2000-87; Palo Alto, CA; USA.

Agesen; "GC Points in a Threaded Environment"; Sun Microsystems; Dec. 1998; pp. 1-20; SMLI TR-98-70; Palo Alto, CA; USA.

Ben-Yitzhak, et al; "An Algorithm for Parallel Incremental Compaction"; IBM Haifa Research Laboratory, Mount Carmel; Jun. 20-21, 2002; pp. 100-105; Berlin, Germany.

Appel; "Simple Generational Garbage Collection and Fast Allocation"; Department of Computer Science-Princeton Universtiy; Mar. 1998; 16 pages; Princeton, N.J., USA.

Detlefs, et al; "Inlining of Virtual Methods"; Sun Microsystems Laboratories; 21 pages; Burlington, MA, USA, 1999.

Flood, et al; "Parallel Garbage Collection for Shared Memory Multiprocessors"; Sun Microsystems; Apr. 2001; USA.

Martin Larose and Marc Freeley, A Compacting Incremental Collector and its Performance in a Production Quality Compiler, Oct. 1998, Proceedings of the 1st International Symposium on Memory Management ISMM '98, vol. 34, Issue 3.

Applying priorities to memory allocation, Robertz, et al.; ISMM '02, Jun. 20-21, 2002.

Efficient garbage collection schemes for casual message logging with independent checkpointing, Ahn, et al., The Journal of Super Computing; pp. 175-196, 2002.

* cited by examiner

| Header 410 | _len_ 415 | Hash 420 | Count 430 | Offset 440 | Char[] chars 450 | Header 460 | _len_ 470 | Ch [0] 480A | ... | Ch [length -1] 480N |

Synthetic Immutable Class Instance 400

FIG. 4

| Header 510 | _len_ 520 | Hash 530 | Count 540 | Offset 550 | _len_ 560 | Ch [0] 570A | ... | Ch [length -1] 570N |

Collapsed Synthetic Immutable Class Instance 500

COMBINING CLASSES REFERENCED BY IMMUTABLE CLASSES INTO A SINGLE SYNTHETIC CLASS

BACKGROUND OF THE INVENTION

1. Field of the Invention

This invention relates to the design, coding, and maintenance of object-oriented applications in computer systems and, more particularly, to efficient use of memory for, caching of, and garbage collection of classes in computer systems.

2. Description of the Related Art

In object-oriented programming, such as programming in the Java® programming language, it is increasingly common to make classes and their instances (objects) immutable. A class in object-oriented programming may be referred to herein as immutable if the state of an instance of the class does not change over its lifetime. The use of immutable classes provides a number of potential advantages in the design, coding, and maintenance of multi-threaded applications. For example, multiple threads may share instances of immutable classes in a safe manner because none of the sharing threads change the immutable object's state. In many applications, a significant percentage of classes are immutable. For example, in many Java®-based applications, instances of the java-.lang.string class account for a significant fraction of the heap. Each string contains exactly one character array, which consists of immutable character objects. Character arrays and strings together may account for a very high percentage of the objects in a system.

It may be desirable to reduce the number of objects in a heap to minimize storage requirements. It may also be desirable to reduce the number of objects to be managed so that garbage collection may be performed more efficiently. These and any other improvements in efficiency in handling immutable classes may have a desirable effect on performance of virtual machines, such as are found in Java®-based systems as well as systems that use statically compiled classes. In view of the above, what is needed are improvements to the uses of immutable classes of objects.

SUMMARY OF THE INVENTION

Various embodiments of a computer system including at least one processor are disclosed. In one embodiment, the processor identifies a first class and a second class. An instance of the first class includes first data fields and an instance of the second class includes second data fields. The first data fields include a data field that references the second class. In response to determining that the first class is immutable and the second class is immutable, the processor constructs a first synthetic immutable class, an instance of which comprises a combination of the first data fields and the second data fields. The processor creates an instance of the first synthetic immutable class in which the first data fields and the second data fields occupy a contiguous region of a memory.

In one embodiment, a static compiler executing at compile time on the processor identifies the first and second classes, determines that the first and second classes are immutable, and constructs the first synthetic immutable class. In an alternative embodiment, the processor executes a virtual machine. During run time, the virtual machine manages allocation and deallocation of memory for storing class instances, identifies the first and second classes, determines that the first and second classes are immutable, and constructs the first synthetic immutable class.

In response to determining the first synthetic immutable class does not include an accessor for the second class, the processor combines a header field of the first data fields and a header field of the second data fields into a single data field in the first synthetic immutable class. In a further embodiment, the processor identifies a third class. An instance of the third class includes third data fields. The first data fields include a data field that references the third class. In response to determining that the third class is immutable, the processor constructs a second synthetic immutable class, an instance of which includes a combination of the first data fields, the second data fields, and the third data fields. The processor creates an instance of the second synthetic immutable class in which the first data fields, the second data fields, and the third data fields occupy a contiguous region of memory. In response to determining the second synthetic immutable class includes exactly one array, the processor combines a length field of the first data fields and a length field of the array into a single data field in the second synthetic immutable class.

In a still further embodiment, the virtual machine includes a garbage collector that reclaims the contiguous region of memory for other use by the virtual machine in response to determining that an instance of the first synthetic immutable class is no longer reachable by other class instances managed by the virtual machine. In a still further embodiment, the contiguous memory region is included in a single cache line.

BRIEF DESCRIPTION OF THE DRAWINGS

FIG. 8 illustrates one embodiment of a process that may be used to construct a synthetic immutable class While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
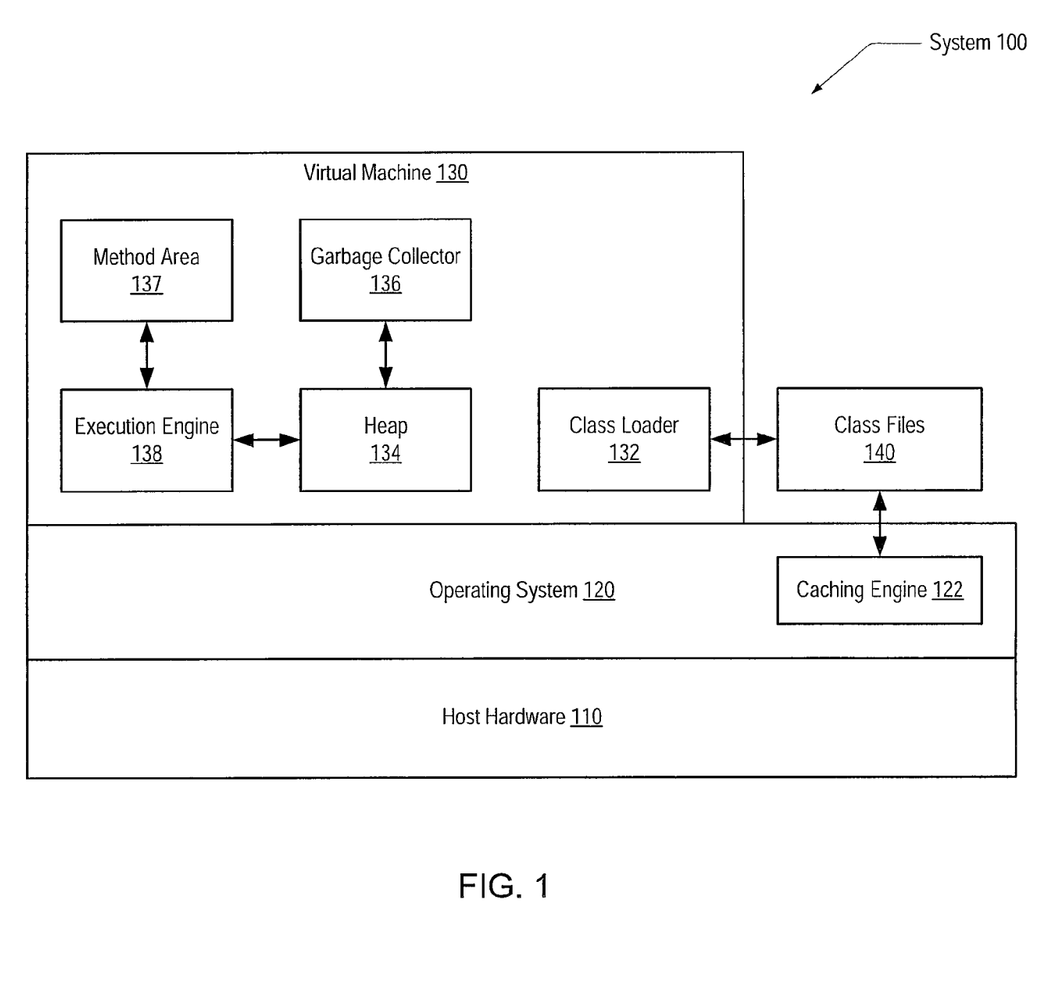
FIG. 1 is a block diagram of one embodiment of a computer system that implements a virtual machine.

Turning now to FIG. 1, a block diagram of one embodiment of a computer system 100 that implements a virtual machine is shown. In the embodiment of FIG. 1, system 100 includes host hardware 110 that supports execution of an operating system 120 that in turn supports execution of a virtual machine 130. Operating system 120 includes a caching engine 122 that manages storage of a variety of files, objects, data, etc. including class files 140 into various levels of cache or system memory. In one embodiment, virtual machine 130 includes a class loader 132, a memory heap 134, a garbage collector 136, an execution engine 138, and a method area 137. Any of the blocks shown in FIG. 1 may be combined together or separated in further blocks, according to a particular embodiment.

Host hardware 110 generally includes all of the hardware included in computer system 100. In various embodiments, host hardware 110 may include one or more processors, memory, peripheral devices, and other circuitry used to couple the preceding components. For example, common personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used.

Operating system 120 may be any OS, such as any of the Windows® OSs available from Microsoft® Corp., (Redmond, Wash.), any UNIX®-type operating system such as Linux, AIX® from IBM® Corporation® (Armonk, N.Y.), Solaris® from Oracle®, HP-UX® from Hewlett-Packard Company® (Palo Alto, Calif.), and so forth. Virtual machine 130 may be any virtual machine. For example, the virtual machine 130 may be a Java®-based virtual machine (JVM). A JVM is a virtual machine that is able to execute Java® bytecode. The JVM may be bundled with a set of standard class libraries to form the Java Runtime Environment® (JRE®). Alternatively, the virtual machine 130 may be a Common Language Runtime that supports the .NET Framework® from Microsoft Corporation®. Other examples of virtual machines may be used and are contemplated. For simplicity, in the discussions that follow Java® and the JRE® may be used as examples, although the invention is in no way limited to Java®-based systems.

During operation, caching engine 122 may transfer data and/or instructions between a backing store and cache memory so that data and instructions that are frequently used by operating system 120 and applications running on operating system 120 are readily available. For example, caching engine 122 may make one or more of class files 140 more readily available to virtual machine 130 by transferring them to a cache memory. In some embodiments, the functions of caching engine 122 may be performed by a combination of caching engine 122 and elements of host hardware 110.

When a class is needed by virtual machine 130, it may be dynamically loaded from cache or system memory by class loader 132. Once class loader 132 has loaded a class, virtual machine 130 may allocate space in heap 134 for one or more instances of the class. Execution engine 138 may make use of class instance (objects0 that are allocated in heap 134 as well as their methods that are stored in method area 137. When an instance of class is no longer needed by virtual machine 130, it may be dynamically removed from heap 134 by garbage collector 136.

Figure 2:
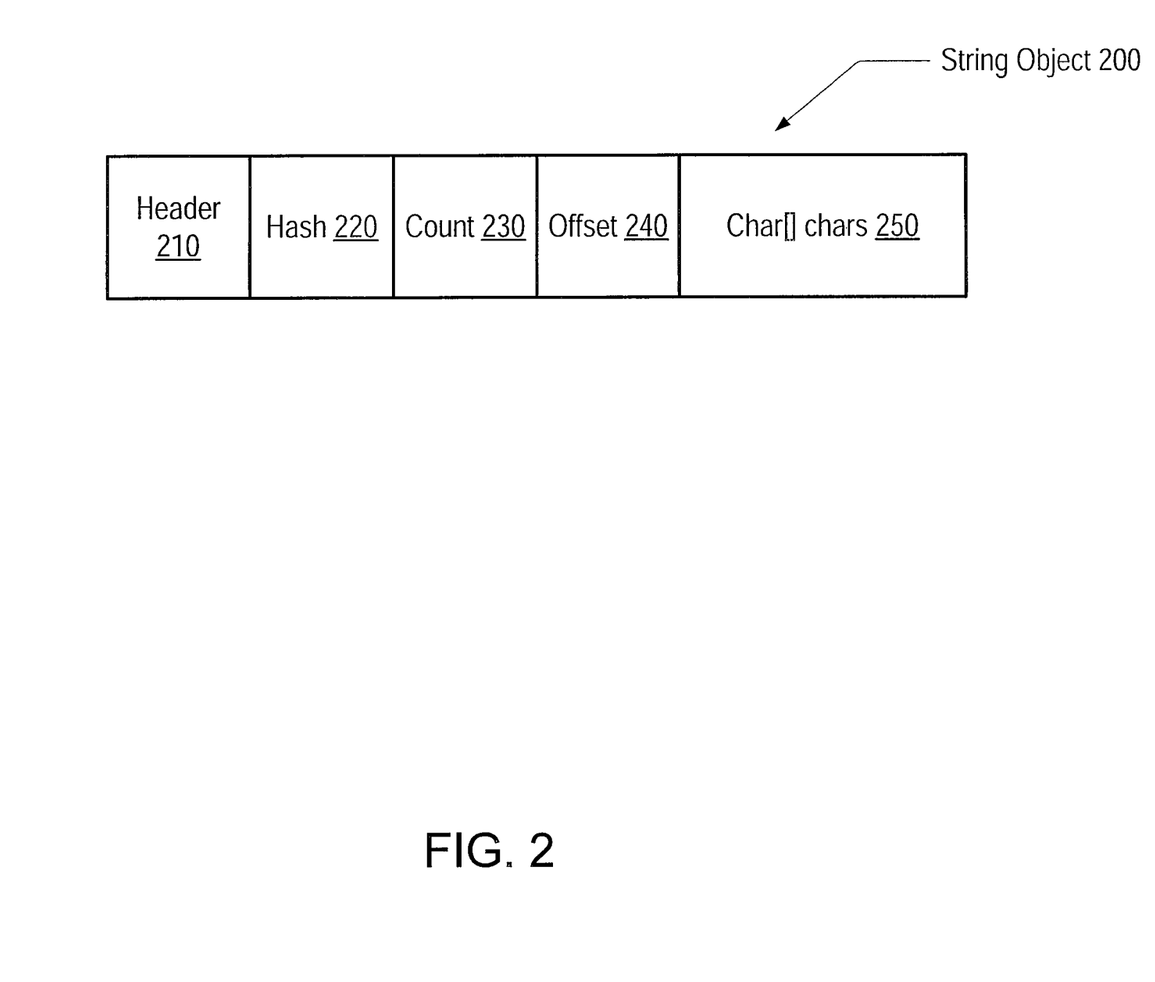
FIG. 2 illustrates one embodiment of a string object.

Assuming by way of example that virtual machine 130 is a JRE®, it is often the case that instances of the java.lang.string class and character arrays account for a significant percentage of the space occupied in heap 134. Turning now to FIG. 2, one embodiment of a string object 200 is shown. In the illustrated embodiment, string object 200 includes a header 210, a hash 220, a count 230, an offset 240, and a reference to a character array, Char[ ] chars 250. Each string object's header 210 may hold runtime state of locks, hashcode ID, and garbage collection as well as a reference to a classid that details the string class's methods. Hash 220 may be a hash code value for string object 200, expressed as an integer. Count 230 may be an integer value that is equal to the number of characters in the string. Offset 240 may be an integer value equal to the offset address of the first byte in the region of storage in which the object is stored. Char[ ] chars 250 may be a reference to a separate sequence of memory occupied by a character array object. Once a string object is constructed, the size and content of the string object remain constant until the object is garbage collected; thus the string is immutable. In one embodiment, the fields illustrated in FIG. 2 may be stored in one contiguous sequence of memory locations, whereas the fields of the character array referenced by string object 200 may be stored in a separate sequence of memory locations.

Figure 3:
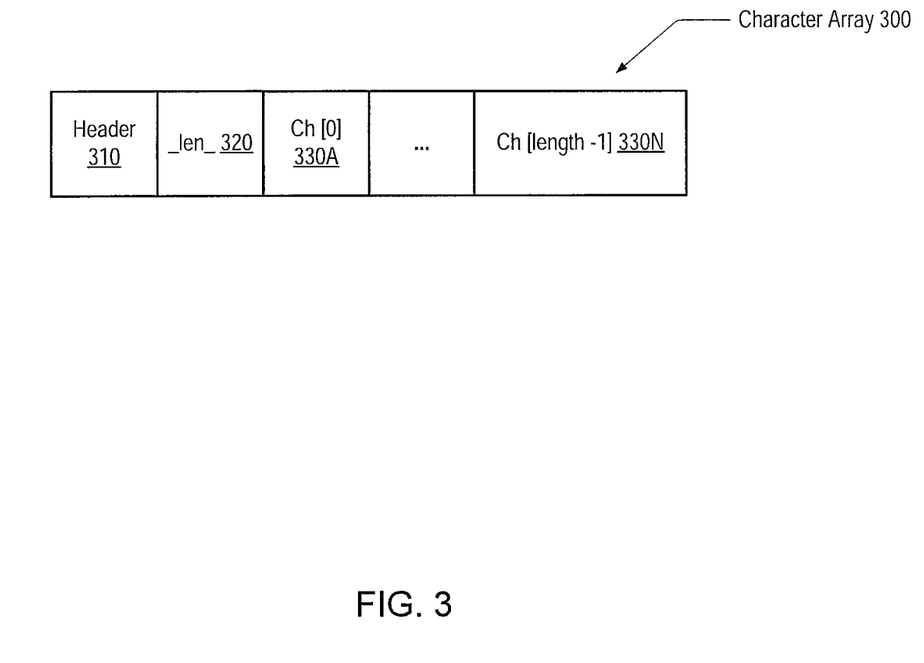
FIG. 3 illustrates one embodiment of a character array.

Turning now to FIG. 3, one embodiment of a character array 300 is shown. In the illustrated embodiment, character array 300 includes a header 310, a length field _len_320, and a sequence of character objects Ch[0] 330A to Ch[length-1] 330N. Each character array's header 310 may hold runtime state of locks, hashcode ID, and garbage collection as well as a reference to a classId that details the character array methods. Length field _len_320 may specify the length of character array 300. Each of character objects Ch[0] 330A to Ch[length-1] 330N may be an instance of a character class. Once a character array is constructed, its remains constant until the array is garbage collected; thus the character array is immutable.

Figure 4:
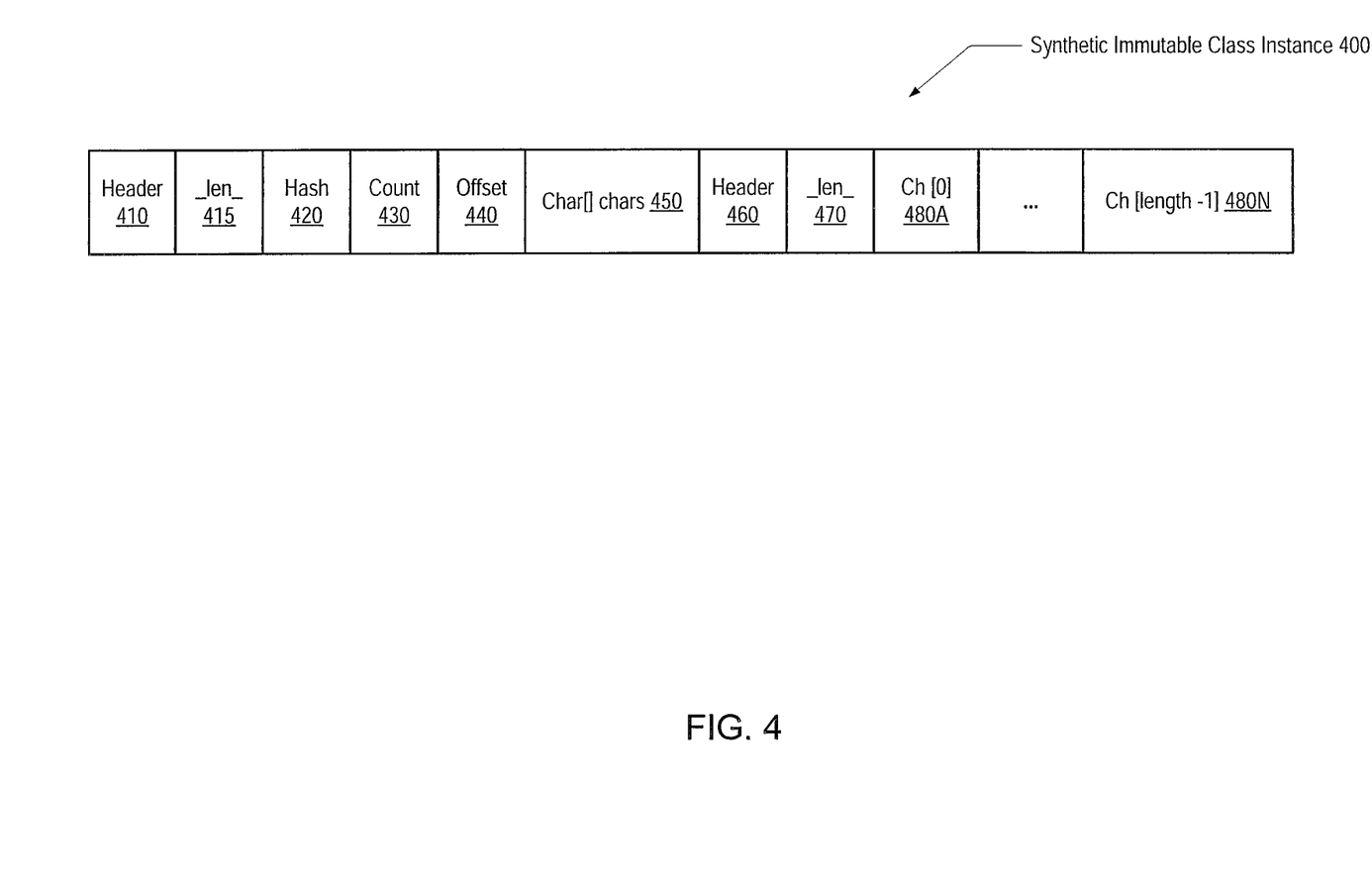
FIG. 4 illustrates one embodiment of an instance of a synthetic immutable class (SIC).
Figure 5:
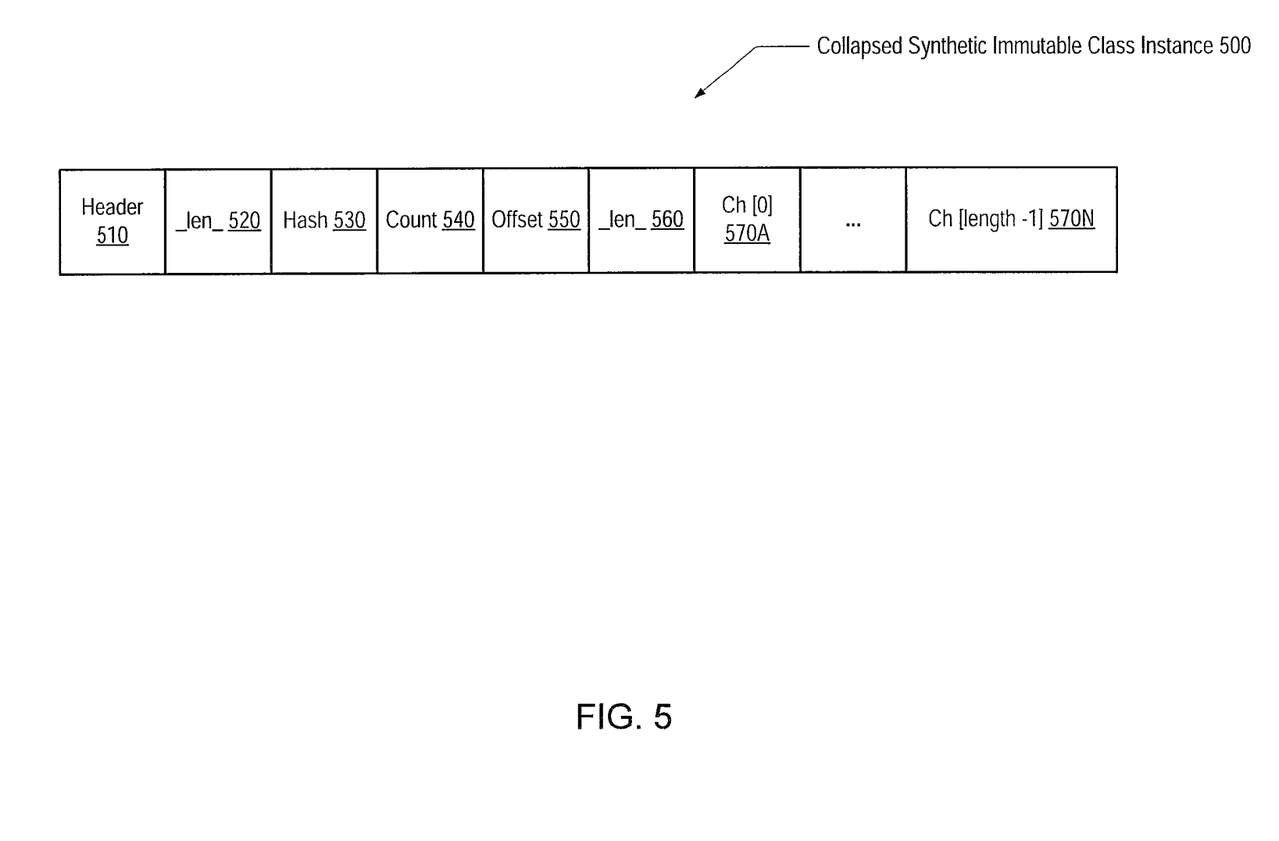
FIG. 5 illustrates one embodiment of a collapsed SIC instance.
Figure 6:
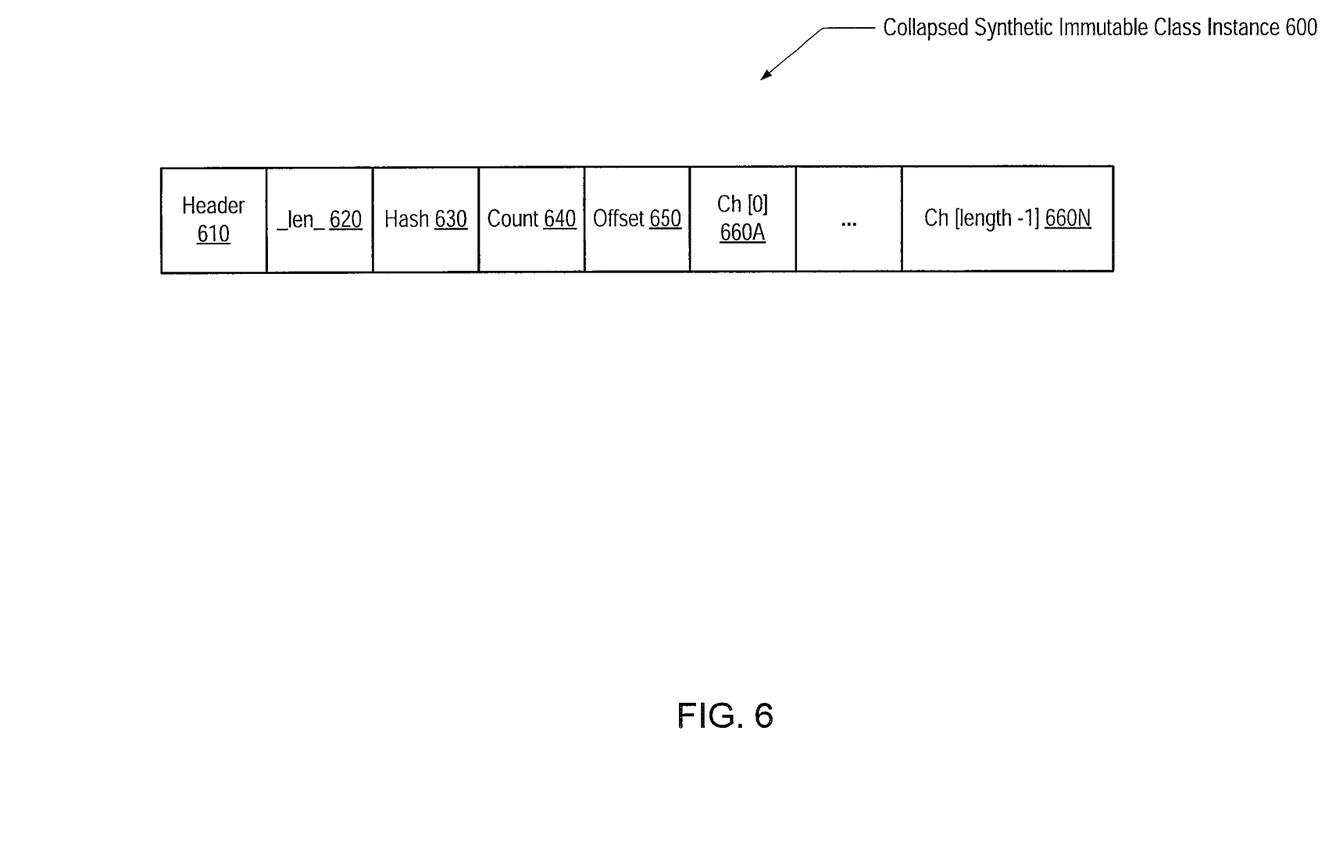
FIG. 6 illustrates an alternative embodiment of a collapsed SIC instance.

During run time operation of a (JVM), a class loader may load classes that are needed to create instances. Once a class is loaded, an allocator may allocate a region of heap memory for storage of the class instances. The following modifications may be made to the operation of a JVM or other virtual machine. During a class load operation, a first class may be analyzed to determine if it is truly immutable. Classes that are not immutable may be handled in a conventional manner. Classes that are determined to be immutable may be further analyzed to determine if they reference other classes that are also determined to be immutable. If it is determined that a first immutable class references one or more other immutable classes, the virtual machine may create a synthetic immutable class (SIC) that groups the fields of the first immutable class with those of all other immutable classes that it references. The virtual machine may make whatever code transformations are necessary to handle the layout of the instance of the new SIC. New methods that account for the new SIC layout may be pushed into the methods of the SIC. In various embodiments, instances of the resulting SIC may occupy a single sequence in memory such as described in FIGS. 4-6 below. In FIGS. 4-6, the string class and character arrays are used as examples of immutable classes for simplicity, although any classes that are determined to be immutable may be used instead of or in addition to strings and characters.

FIG. 4 illustrates one embodiment of an instance of a synthetic immutable class 400. In the illustrated embodiment, instance 400 includes a header 410, a length field _len_415, a hash 420, a count 430, an offset 440, a reference to a character array, Char[ ] chars 450, a header 460, a length field _len_470, and a sequence of character objects Ch[0] 480A to Ch[length-1] 480N. The headers 410 and 460 may hold runtime state and function similarly to headers 210 and 310. Length field _len_415 may be a synthetic length field that specifies the length of the SIC instance. If an SIC is a combination of fixed length objects, the size indicated by length field _len_415 may be predefined by the predefined lengths of the components objects. However, if an SIC is a combination of a fixed length object and one or more arrays, the length field _len_415 may be a function of the size of the arrays. Hash 420, count 430, offset 440, and Char[ ] chars 450 may have the same functions as hash 220, count 230, offset 240, and Char[ ] chars 250. Length field _len_470, and character objects Ch[0] 480A to Ch[length-1] 480N may have the same functions as length field _len_320, and character objects Ch[0] 330A to Ch[length-1] 330N.

It is noted that although the fields of two or more objects have been combined into one SIC instance, it may be desirable to maintain separate headers for the original objects inside the containing instance. In one embodiment, separate headers are maintained to allow for contained instances to be accessible outside of the containing instance. For example, if a string contains an accessor 'char[ ] getChars( )' the accessor may be expected to return a reference to the header of the character array object, as would be the case when accessing any other object. In a further embodiment, special handling may be added to a virtual machine to account for a contained object that outlives its containing SIC instance. The following code fragment illustrates this situation:
String s="Hello World"
Char[ ] chars=s.getChars( );
S=null;
At this point, the String portion of the SIC instance may be garbage collected. Consequently, the character array Char[ ] may be extracted from its containing synthetic class instance.

In an alternative embodiment, it may be determined that the containing SIC instance has no accessors. In other words, there are no reference leaks from the SIC instance. In such cases, internal references between objects in the SIC instance may be eliminated. One embodiment of a resulting, collapsed SIC instance is illustrated in FIG. 5. In the illustrated embodiment, instance 500 includes a header 510, a length field _ len_520, a hash 530, a count 540, an offset 550, a length field _ len_560, and a sequence of character objects Ch[0] 570A to Ch[length-1] 570N that correspond to and perform similar functions to those of header 410, length field_len_415, hash 420, count 430, offset 440, length field_len_470, and character objects Ch[0] 480A to Ch[length-1] 480N, respectively.

In another alternative embodiment, if a containing SIC instance contain a single array, as is the case with the string class, additional reductions in an SIC instance may be made. FIG. 6 illustrates one embodiment of such an instance of a synthetic immutable class 600. In the illustrated embodiment, instance 600 includes a header 610, a length field _len_620, a hash 630, a count 640, an offset 650, and a sequence of character objects Ch[0] 660A to Ch[length-1] 660N. Header 610, hash 630, count 640, offset 650, and character objects Ch[0] 660A to Ch[length-1] 660N correspond to and perform similar functions to those of header 510, hash 530, count 540, offset 550, and character objects Ch[0] 570A to Ch[length-1] 570N, respectively. Length field _len_620 may be a length that is derived from lengths _len_520 and _len_560.

Any of SIC instances 400, 500, or 600 shown in FIGS. 4-6 may include more or fewer fields than those illustrated according to a particular embodiment. In addition, any of SIC instances 400, 500, or 600 may have the effect of reducing the number of objects that have to be garbage collected, leading to lower garbage collection pause times and more efficient collection phases. For example, in one embodiment in which the garbage collector inspects each object to determine if it is currently reachable, having fewer objects to inspect may reduce the total time required for garbage collection. In addition, since the fields of containing and contained objects are kept together in a contiguous memory sequence, cache coherence opportunities may be increased and the possibility of code optimizations to take advantage of deterministic distance between fields may also increase. For example, in one embodiment, an operation that traverses classes may produce fewer cache misses if the fields of containing and contained objects are kept together in a contiguous memory sequence. Finally, SIC instances 500 and 600 may remove redundant fields, saving space in the memory heap. For example, in one embodiment, each header in Java® object may be 8-12 bytes. Therefore, each of the SIC instances 500 and 600 may be smaller than the original referring and referred instances by at least 8-12 bytes.

The examples and embodiment described above are generally directed to systems that include a virtual machine. However, in alternative embodiments, synthetic immutable classes may be created by a static compiler at compile time if two related classes can be determined to be immutable. Although statically compiled classes are not typically garbage collected, nevertheless, reductions in storage requirements and cache misses may still occur in such embodiments.

Figure 7:
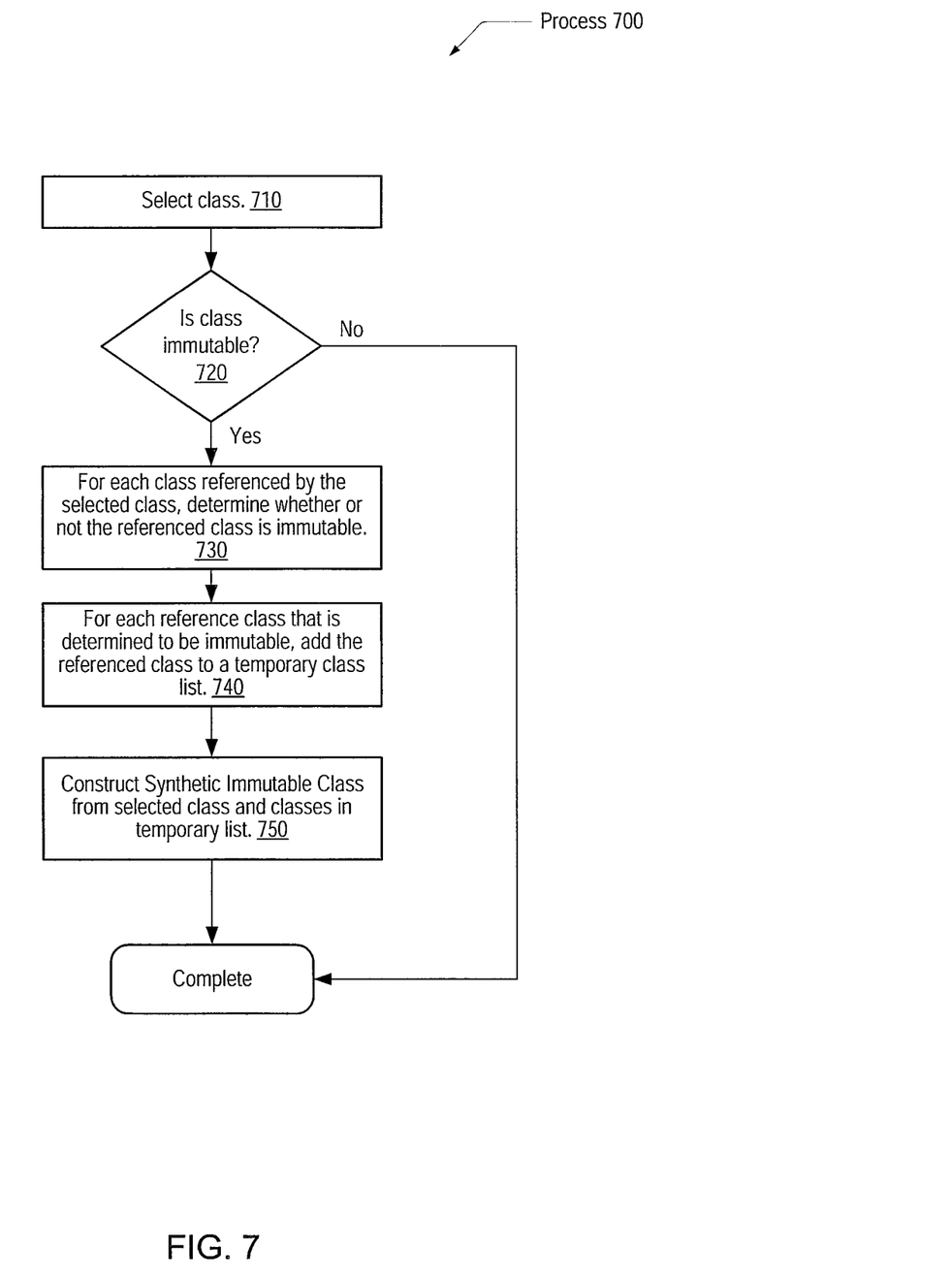
FIG. 7 illustrates one embodiment of a process that may be used to assemble classes for inclusion in a synthetic immutable class

FIG. 7 illustrates one embodiment of a process 700 that may be used to assemble classes for inclusion in a synthetic immutable class. Process 700 may begin by selecting a candidate class from which to create a synthetic immutable class (block 710). If the selected class is not determined to be immutable, process 700 is completed without creating a synthetic immutable class (decision block 720). If the selected class is determined to be immutable (decision block 720), for each class selected reference by the selected class, it may be determined if the referenced class is immutable (block 730). Each referenced class that is determined to be immutable may be added to a temporary class list (block 740). Once all of the referenced classes have been evaluated, a synthetic immutable class may be constructed from the selected class and the classes in the temporary class list (block 750), completing process 700. Details of one embodiment of a process by which the temporary class may be constructed are given in process 800 of FIG. 8.

Figure 8:
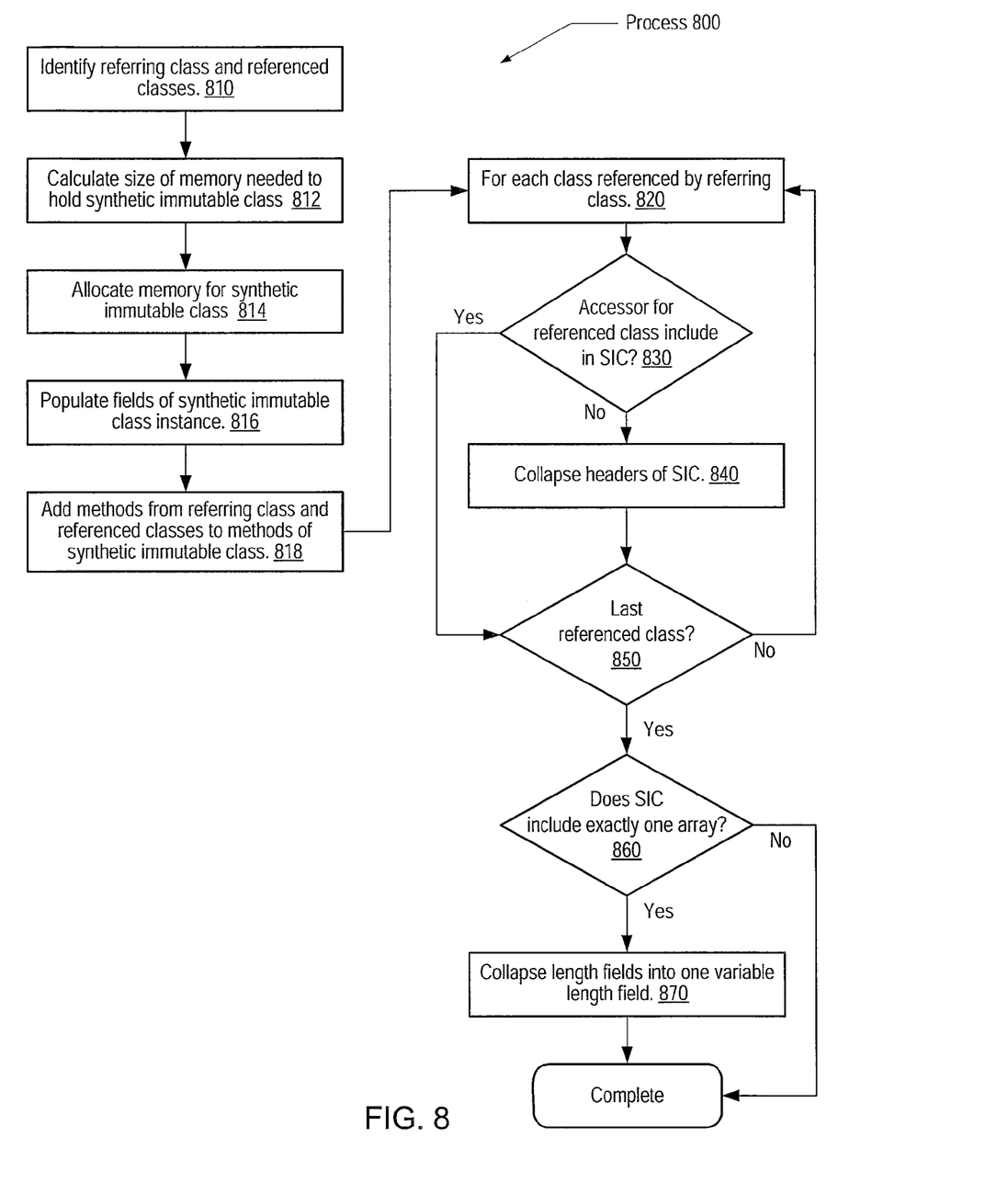

FIG. 8 illustrates one embodiment of a process 800 that may be used to construct a synthetic immutable class. Process 800 may begin with identifying a class and one or more classes that are referenced by the identified class (block 810). Once a referring class and a set of referenced classes have been identified, a size of memory needed to hold a synthetic immutable class that combines the fields of the referring class and the set of referenced classes may be calculated (block 812). A memory region sufficient to hold the calculated size SIC may then be allocated (block 814) and the fields of a SIC instance populated in the allocated region (block 816). Methods of the referring class and the referenced class may be added to the methods of the SIC (block 818).

For each referenced class in the SIC a determination may be made whether or not the SIC instance includes an accessor for the referenced class (block 820). If the SIC includes an accessor for the referenced class (decision block 830) and if the referenced class is not the last referenced class to be evaluated (decision block 850), another referenced class may be evaluated at block 830). If the SIC does not include an accessor for the referenced class (decision block 830), the headers of the SIC that correspond to the referring class and the referenced class may be collapsed into a single header (block 840). If the referenced class is not the last referenced class to be evaluated (decision block 850), another referenced class may be evaluated at block 830). If the referenced class is the last referenced class to be evaluated (decision block 850), a determination may be made if the SIC includes exactly one array. If the SIC includes exactly one array (decision block 860), the length field of the SIC that corresponds to the length of the array may be collapsed into the length field that corresponds to the length of the entire SIC instance (block 870). If the SIC does not include exactly one array (decision block 860) or after collapsing the length fields, process 800 is complete.

It is noted that the foregoing flow charts are for purposes of discussion only. In alternative embodiments, the elements depicted in the flow charts may occur in a different order, or in some cases concurrently. Additionally, some of the flow chart elements may not be present in various embodiments, or may be combined with other elements. All such alternatives are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for execution by a processor in a computer system, the method comprising:
    identifying a first class of a plurality of classes, wherein an instance of the first class comprises a first plurality of data fields;
    identifying a second class of the plurality of classes, wherein an instance of the second class comprises a second plurality of data fields, and wherein the first plurality of data fields includes a data field that references the second class;
    in response to determining that the first class is immutable and the second class is immutable, constructing a first synthetic immutable class, an instance of which comprises a combination of the first plurality of data fields and the second plurality of data fields; and
    creating an instance of the first synthetic immutable class in which the first plurality of data fields and the second plurality of data fields occupy a contiguous region of memory;
    wherein identifying the first class, identifying the second class, determining that the first class is immutable, determining that the second class is immutable, and constructing the first synthetic immutable class comprises using at least one of a static compiler at compile time or a virtual machine at run time.

2. The method of claim 1, wherein the virtual machine includes a garbage collector configured to reclaim the contiguous region of memory for other use by the virtual machine in response to determining that an instance of the first synthetic immutable class is no longer reachable by other class instances managed by the virtual machine.

3. The method of claim 1, further comprising combining a header field of the first plurality of data fields and a header field of the second plurality of data fields into a single data field in the first synthetic immutable class, in response to determining the first synthetic immutable class does not include an accessor for the second class.

4. The method of claim 1, further comprising:
    identifying a third class of the plurality of classes, wherein an instance of the third class comprises a third plurality of data fields, and wherein the first plurality of data fields includes a data field that references the third class; and
    in response to determining that the third class is immutable, constructing a second synthetic immutable class, an instance of which comprises a combination of the first plurality of data fields, the second plurality of data fields, and the third plurality of data fields; and
    creating an instance of the second synthetic immutable class in which the first plurality of data fields, the second plurality of data fields, and the third plurality of data fields occupy a contiguous region of memory.

5. The method of claim 1, further comprising in response to determining the second synthetic immutable class includes exactly one array, combining a length field of the first plurality of data fields and a length field of the array into a single data field in the second synthetic immutable class.

6. A computer system including at least one processor configured to:
    identify a first class of a plurality of classes, wherein an instance of the first class comprises a first plurality of data fields;
    identify a second class of the plurality of classes, wherein an instance of the second class comprises a second plurality of data fields, and wherein the first plurality of data fields includes a data field that references the second class;
    in response to determining that the first class is immutable and the second class is immutable, construct a first synthetic immutable class, an instance of which comprises a combination of the first plurality of data fields and the second plurality of data fields; and
    create an instance of the first synthetic immutable class in which the first plurality of data fields and the second plurality of data fields occupy a contiguous region of a memory;
    wherein identifying the first class, identifying the second lass, determining that the first class is immutable, determining that the second class is immutable, and constructing the first synthetic immutable class comprises using at least one of a static compiler at compile time or a virtual machine at run time.

7. The computer system of claim 6, wherein the virtual machine is further configured to:
    manage the allocation and deallocation of memory for storing class instances.

8. The computer system of claim 7, wherein the virtual machine includes a garbage collector configured to reclaim the contiguous region of memory for other use by the virtual machine in response to determining that an instance of the first synthetic immutable class is no longer reachable by other class instances managed by the virtual machine.

9. The computer system of claim 6, wherein in response to determining the first synthetic immutable class does not include an accessor for the second class, the processor is further configured to combine a header field of the first plurality of data fields and a header field of the second plurality of data fields into a single data field in the first synthetic immutable class.

10. The computer system of claim 6, wherein the processor is further configured to:
    identify a third class of the plurality of classes, wherein an instance of the third class comprises a third plurality of data fields, and wherein the first plurality of data fields includes a data field that references the third class; and
    in response to determining that the third class is immutable, construct a second synthetic immutable class, an instance of which comprises a combination of the first plurality of data fields, the second plurality of data fields, and the third plurality of data fields; and
    create an instance of the second synthetic immutable class in which the first plurality of data fields, the second plurality of data fields, and the third plurality of data fields occupy a contiguous region of memory.

11. The computer system of claim 6, wherein in response to determining the second synthetic immutable class includes exactly one array, the processor is further configured to combine a length field of the first plurality of data fields and a length field of the array into a single data field in the second synthetic immutable class.

12. The computer system of claim 6, wherein the contiguous memory region is included in a single cache line.

13. A non-transitory computer readable storage medium storing a plurality of instructions which, when executed, cause a processor to:
- identify a first class of a plurality of classes, wherein an instance of the first class comprises a first plurality of data fields;
- identify a second class of the plurality of classes, wherein an instance of the second class comprises a second plurality of data fields, and wherein the first plurality of data fields includes a data field that references the second class;
- in response to determining that the first class is immutable and the second class is immutable, construct a first synthetic immutable class, an instance of which comprises a combination of the first plurality of data fields and the second plurality of data fields; and
- create an instance of the first synthetic immutable class in which the first plurality of data fields and the second plurality of data fields occupy a contiguous region of a memory;
- wherein identifying the first class, identifying the second lass, determining that the first class is immutable, determining that the second class is immutable, and constructing the first synthetic immutable class comprises using at least one of a static compiler at compile time or a virtual machine at run time.

14. The computer readable storage medium of claim 13, wherein during run time, the virtual machine is further configured to: manage allocation and deallocation of memory for storing class instances.

15. The computer readable storage medium of claim 13, wherein the instructions are further executable to cause the processor to:
- identify a third class of the plurality of classes, wherein an instance of the third class comprises a third plurality of data fields, and wherein the first plurality of data fields includes a data field that references the third class; and
- in response to determining that the third class is immutable, construct a second synthetic immutable class, an instance of which comprises a combination of the first plurality of data fields, the second plurality of data fields, and the third plurality of data fields; and
- create an instance of the second synthetic immutable class in which the first plurality of data fields, the second plurality of data fields, and the third plurality of data fields occupy a contiguous region of memory.

16. The computer readable storage medium of claim 13, wherein the instructions are further executable to cause the processor to:
- combine a header field of the first plurality of data fields and a header field of the second plurality of data fields into a single data field in the first synthetic immutable class in response to determining the first synthetic immutable class does not include an accessor for the second class; and
- combine a length field of the first plurality of data fields and a length field of the array into a single data field in the second synthetic immutable class in response to determining the second synthetic immutable class includes exactly one array.

\* \* \* \* \*